Figure 1:
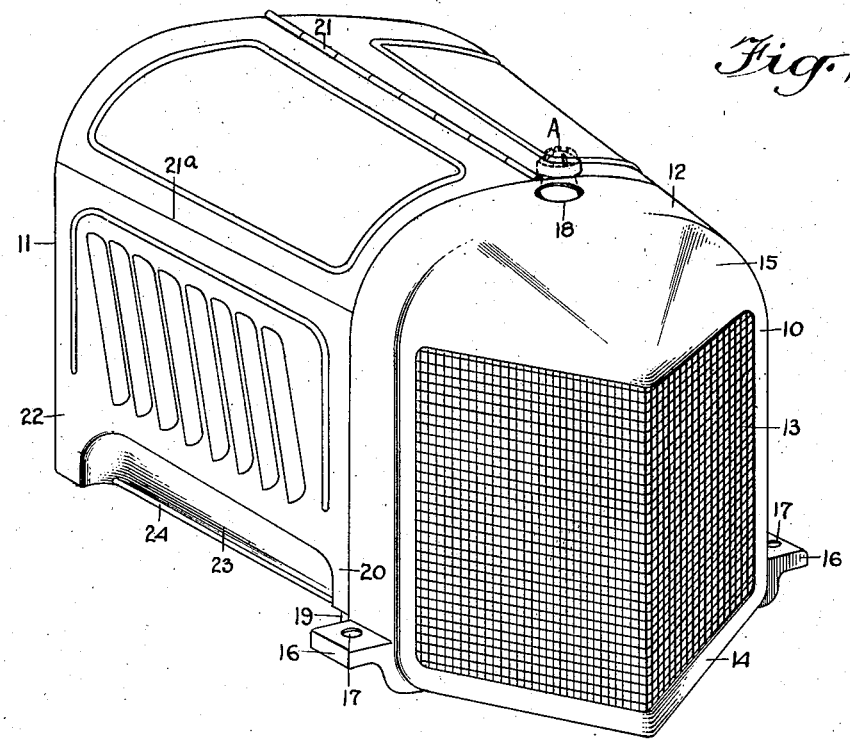

D McR. LIVINGSTON.
COMBINATION HOOD FOR AUTOMOBILES.
APPLICATION FILED FEB. 12, 1915.

1,156,017.

Patented Oct. 5, 1915.
2 SHEETS—SHEET 1.

WITNESSES

INVENTOR
D Mc Ra Livingston
BY
ATTORNEYS

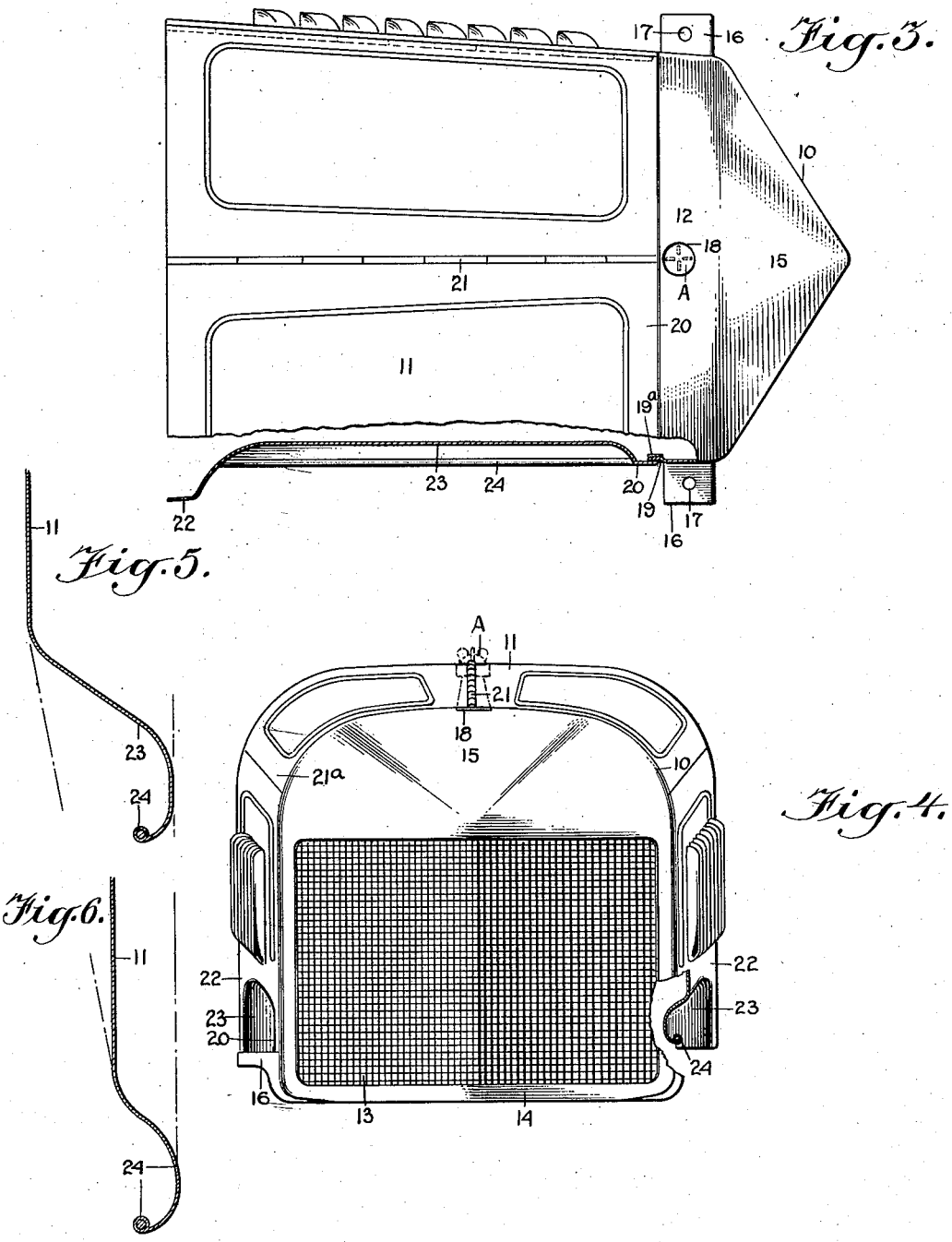

UNITED STATES PATENT OFFICE.

D McRA LIVINGSTON, OF NEW YORK, N. Y.

COMBINATION-HOOD FOR AUTOMOBILES.

1,156,017. Specification of Letters Patent. Patented Oct. 5, 1915.

Application filed February 12, 1915. Serial No. 7,755.

*To all whom it may concern:*

Be it known that I, D McRA LIVINGSTON, a citizen of the United States, and a resident of the city of New York, borough of Manhattan, in the county and State of New York, have invented a new and Improved Combination - Hood for Automobiles, of which the following is a full, clear, and exact description.

My invention relates to a combination motor hood and radiator hood for automobiles, and is more particularly intended for use on Ford cars, although not limited in all its features to use on this special car.

The large majority of automobile owners appear at present, to be partial to what are known as stream line effects in design. In seeking to obtain stream line effects in the Ford automobile, the chassis, and the character of its wood strip, at the front, as well as the structure and form of the radiator, present marked difficulties, and this is, to a certain extent, true of other makes of automobiles.

The prime object of my invention is to provide a mask adapted to conceal the motor and radiator casing of an automobile, and so constructed as to surmount the structural difficulties and limitations encountered in producing stream line effects in automobiles regardless of the character of the motor and radiator casing on said automobile. Thus an automobile equipped with a radiator and casing, presenting for instance, lines substantially parallel with the longitudinal axis of the radiator, with a corresponding motor casing, may be masked, and the automobile given graceful stream line effects at the front, by means of my improved cover.

My invention also has for its objects to provide a combined radiator hood and motor hood in which the former will afford support for the latter and permit of the actual and apparent length of the motor hood being increased at the expense of the radiator hood, thereby desirably decreasing the apparent depth of the automobile radiator, and to provide also for the radiator hood being considerably increased in width and height; regardless of the relative dimensions of the motor and radiator to which the hoods are applied; whereby to produce the stream line effects desired and otherwise to greatly enhance the esthetic appearance.

The invention furthermore has for its objects to produce the desired esthetic effects by a strong and simple structure, readily applied to an automobile over the motor and radiator casing thereof, without making structural changes in the latter; and to provide a combination hood so constructed as to have proper accommodation and strong support on standard features of the automobile.

Figure 2:
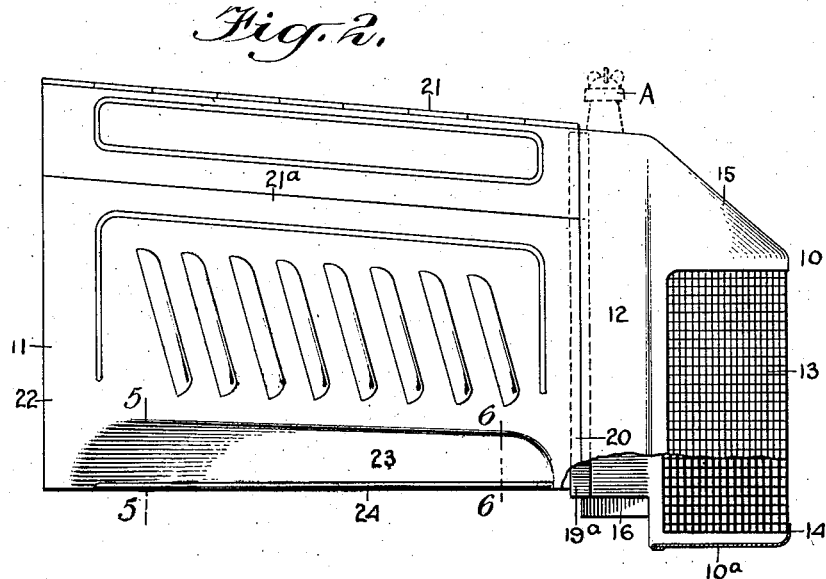

Reference is had to the accompanying drawings forming part of this specification, in which similar characters of reference indicate corresponding parts in all the views, and in which:

Figure 1 is a perspective view of a combination hood embodying my invention; Fig. 2 is a side elevation thereof with parts broken out; Fig. 3 is a plan view with parts broken out and others in section; Fig. 4 is a front elevation with parts broken out and others in section; Fig. 5 is an enlarged fragmentary transverse vertical section on line 5—5 Fig. 2; and Fig. 6 is an enlarged transverse vertical section on line 6—6 Fig. 2.

In constructing a practical embodiment of my invention in accordance with the illustrated example, a radiator hood section 10 is provided, and a motor hood section 11. The section 10 is adapted to be placed over the radiator casing of an automobile without altering either the radiator, its casing or the automobile structure, to thereby cover and mask said radiator and casing. The hood or cover section 10 is formed with a body or rear portion 12 of approximately arched form. The front of the radiator hood section 10 is formed with a grid 13, or otherwise provided with openings to permit air to pass therethrough to the radiator. Preferably the radiator hood section 10 is formed with a tapering or pointed front as shown. It is formed with a bottom 10ª in front of the body 12, it presents a frame 14 at the bottom and sides of the grid 13, and above the grid the top 15 tapers downwardly and forwardly from the arched rear portion or body 12 to avoid a flat appearance at the front. The closed bottom element 10ª and the frame 14, constitute a front extension rigidly sustaining the grid beyond the front of the radiator casing of the automobile.

In order to afford support for the radiator hood section 10 on the automobile, said section is formed near the bottom with stamped ears or lugs 16 extending laterally at a sufficient height from the bottom edge of the said section for the said lugs 16 to fit over the lateral supporting lugs of the radiator. Said lugs 16 are formed with vertical bolt holes 17 to receive the usual securing bolts of the radiator. At the top the body 12 has a hole 18 whereby the section 10 may be dropped over the usual filling neck of the radiator, said neck being indicated by dotted lines and designated by the letter A.

In order to afford support for the front edge of the motor hood section 11 of the combination mask on the rear portion of the radiator hood section 10, I form on the latter a ledge 19 on which ledge the front edge 20 of the motor hood 11 is accommodated. In the form shown the ledge is integral with the body 12, being depressed to accommodate the edge of the hood 11; also, I reinforce the integral ledge by a separate strip 19ª applied thereto at the inside. It is to be understood that the motor hood 11 is formed of two members movably connected along a median line as by a hinge 21 and along side lines 21ª by blind hinges, as usual. The rear edge 22 of the motor hood 11 is adapted to be received on the dash of the automobile, or on a ledge provided for the purpose, according to the character of the automobile as to whether it is formed with a cowl or a flat dash.

The sides of the motor hood 11 are formed near the bottom with depressions 23 ranging longitudinally thereof, but terminating short of the front edge 20 and the rear edge 22, so that the said front and rear edges are continued to the bottom of the hood 11 to afford ample engagement for said hood with the radiator hood 10 and with the dash respectively. The lower edge of the depressed portion 23 is formed with a bead 24 which is adapted to be engaged by the usual hood-securing hooks provided on automobiles.

The motor hood 11 flares rearwardly in order to contribute to producing stream line effects in the automobile. The radiator hood 10 contributes also to the production of stream line effects by having a slight flare corresponding approximately with the flare of the hood 11. Thus, notwithstanding the flare of the combined hood, the depressed portions 23 provide for the proper securing of the hood 11 on the usual wood strip of the chassis, and support is at the same time afforded said hood 11 at the front and back, notwithstanding the disparity between the shape and dimensions of the combination hood and the automobile structure. The structure it will be seen is of self-sustaining material, and maintains its shape, while the supports of the sections 10—11 on the automobile are firm and secure and the motor section receives support on the rear portion of the radiator section of the cover. Moreover, it will be seen that I am permitted freedom of design in obtaining the stream line effects regardless of the structural restrictions and limitations presented by the motor and radiator casing of the automobile or by the chassis and other members of said automobile. The provision of the ledge support 19 on the radiator hood 10 for receiving the front edge of the motor hood 11 enables me to locate the said ledge and the meeting edges of the respective hoods at a point forward of the rear end of a radiator. The modern tendency in automobile designs is to produce unitary lines in the radiator and the motor hood, while in older types the two were distinct. In these older designs too, the radiator in many cases presents dimensions and lines incompatible with stream line effects in the automobile. The proportionate depth of flat front radiators relatively to the motor hood, is decreased in the newer designs. With my construction the radiator hood or mask can be made to give pointed radiator effects, and the actual as well as the apparent length of the motor hood can be materially increased regardless of the depth of the radiator and its casing on the automobile to which my hood is applied. I am enabled also to increase the apparent height and width of the radiator by the improved hood, and otherwise to overcome any objectionable elements as to the lines and dimensions of the radiator itself, so that in producing stream line effects in an automobile, the difficulties presented by the dimensions and shapes of radiators of certain types are entirely overcome.

The construction, it will be seen, provides for the independent support of the radiator hood and motor hood section of the mask on the automobile, as well as a support for the front of the motor hood members on the radiator hood. Furthermore, the improved hood can be applied to an automobile and removed therefrom with great facility, so that no skilled workmanship is required, nor alteration of the standard parts in the machines to which the invention is applicable.

Having thus described my invention, what I claim as new and desire to secure by Letters Patent, is:

1. A mask adapted to conceal the motor and radiator casing of an automobile, comprising a motor hood section, and a separate radiator hood section the latter being adapted to form a removable cover for a radiator, each section being formed of self-sustaining material, and the motor hood section of the mask having support at its front edge on the removable radiator hood section of the mask, together with means for securing said mask in place on an automobile over the motor and radiator casing independently of the said motor and radiator casing.

2. A combination hood for use on automobiles, comprising a motor hood section, and a separate radiator hood section, said motor hood section flaring rearwardly from its front edge and presenting diverging bottom edges having members to engage the hood-retaining hooks of an automobile, the said sections joining each other at their adjacent edges and the front section presenting at its rear portion a rearward flare corresponding substantially with the flare of the motor hood section.

3. A combination hood for use on automobiles, comprising a motor hood section and a separate radiator hood section adapted to form a removable cover for a radiator, the said motor hood section flaring rearwardly and joining at its front edge the rear portion of the radiator hood section, the radiator hood section having its said rear portion flaring to substantially correspond with the flare of the motor hood section.

4. A combination hood for use on automobiles, comprising a rear section formed of movably connected members and constituting a motor cover, and front section constituting a removable cover for a radiator, said front section having an arch formed at the rear portion thereof and provided at said arched portion with means affording support for the respective members of the said rear section.

5. A combination hood for use on automobiles, comprising a rear section constituting a motor cover and a front section adapted to constitute a removable cover for the radiator of an automobile, the said front section having means at the rear portion on which the rear section is movably supported, and both of said sections having individual means to afford support therefor on an automobile.

6. A combination hood for use on automobiles, comprising a front hood section adapted to cover a radiator and formed with air passages through the front thereof to permit the entrance of air to the radiator, and a separate rear section joining the front section and constituting a motor cover, the said rear section being composed of members hingedly connected at longitudinal meeting edges.

7. A motor hood for automobiles, made flaring rearwardly and having front and rear supporting edges, the hood furthermore presenting depressions at the lower portions of the sides, said depressions terminating short of the said front and back edges, and having means along the lower edges of the depressions inward from the said front and back edges in position to be engaged by the hood-retaining means on the frame members of an automobile.

8. A motor hood for automobiles, said hood flaring rearwardlly, the side of the hood having depressions along the bottom edges terminating short of the front and rear edges, said depressed portions having bottom edge members adapted to be engaged by the hood-engaging means on the frame members of an automobile, and the said front and rear edge portions being continued to the bottom and disposed at the bottom laterally beyond the said depressed portion to afford front and rear supporting members for the said hood.

9. A combination hood for use on automobiles, comprising a motor hood section and a separate radiator hood section, said radiator hood section having a ledge at the rear portion thereof receiving the front edge of the motor hood section, and the said sections having separate means to afford support to the same on automobile parts.

10. A mask adapted to cover the radiator and its casing of an automobile and conceal the same, said mask comprising a cover of self-sustaining material having the front open for the entrance of air to a radiator and open at the rear end and including means to secure said mask on an automobile over the radiator and its casing independently of the said radiator and casing.

11. A hood adapted to form a removable cover for the radiator of an automobile, said hood having a front open for the entrance of air to a radiator, and lateral members at the sides, near the bottom whereby to secure the same on an automobile, the said hood furthermore having at its rear edge means adapted to afford support for a motor hood.

12. A hood for automobiles, said hood being flaring rearwardly and comprising a motor hood section and a separate radiator hood section, on which the motor hood section is movably supported at its front edge, said motor hood section having depressions at the sides near the bottom, the said depressions terminating short of the front and rear edges of the motor hood section, the depressions having beads along the bottom edges adapted to be engaged by the hood-engaging means on the frame members of an automobile, said front and rear edges being continued to the bottom and projecting at the bottom laterally beyond the said depressions, the said rear edge being adapted to have support on an automobile dash and the said front edge with its downward continuations having movable support on the rear end of the radiator hood section.

13. A mask adapted to conceal the motor and radiator casing of an automobile, comprising an inclosure of self-sustaining material, including means for securing the same in place on an automobile over the motor and radiator casing independently of the said motor and radiator casing.

14. A mask adapted to conceal the motor and radiator casing of an automobile, comprising an inclosure of self-sustaining material, including means for securing the same in place on an automobile over the motor and radiator casing independently of the said motor and radiator casing, and spaced therefrom.

15. A mask adapted to conceal the motor and radiator casing of an automobile, comprising an inclosure of self-sustaining material, including means for securing the same in place on an automobile over the motor and radiator casing independently of the said motor and radiator casing, said inclosure being flared from the front rearwardly.

16. A mask adapted to conceal the motor and radiator casing of an automobile, comprising an inclosure composed of separable radiator and motor sections of self-sustaining material, including means for securing the same in place on an automobile over the motor and radiator casing, independently of the said motor and radiator casing.

17. A mask adapted to form a removable cover for the radiator and its casing, of an automobile, and conceal the same, said mask having a front open for the entrance of air to the radiator, and having means to secure the same on an automobile independently of the radiator and its casing, said mask including a front extension comprising a bottom member and an open frame sustained on said bottom member to lie forward of the radiator and its casing, in simulation of a radiator front.

In testimony whereof I have signed my name to this specification in the presence of two subscribing witnesses.

D McRA LIVINGSTON.

Witnesses:
 J. L. McAuliffe,
 G. H. Emslie.